United States Patent
Kremer et al.

(10) Patent No.: US 11,237,453 B2
(45) Date of Patent: Feb. 1, 2022

(54) OPTICAL ASSEMBLY AND METHOD FOR INFLUENCING THE BEAM DIRECTION OF AT LEAST ONE LIGHT BEAM

(71) Applicant: Leica Microsystems CMS GmbH, Wetzlar (DE)

(72) Inventors: Manuel Kremer, Leimen (DE); Dirk-Oliver Fehrer, Bad Schoenborn (DE); Lars Friedrich, Weinheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 221 days.

(21) Appl. No.: 16/470,985

(22) PCT Filed: Dec. 22, 2017

(86) PCT No.: PCT/EP2017/084303
§ 371 (c)(1),
(2) Date: Jun. 19, 2019

(87) PCT Pub. No.: WO2018/115397
PCT Pub. Date: Jun. 28, 2018

(65) Prior Publication Data
US 2019/0391460 A1  Dec. 26, 2019

(30) Foreign Application Priority Data
Dec. 23, 2016 (DE) .................. 10 2016 125 630.7

(51) Int. Cl.
*G02F 1/33* (2006.01)
*G02B 27/10* (2006.01)
(Continued)

(52) U.S. Cl.
CPC ........... *G02F 1/33* (2013.01); *G02B 27/1006* (2013.01); *G02B 27/123* (2013.01); *G02B 27/145* (2013.01); *G02B 2005/1804* (2013.01)

(58) Field of Classification Search
CPC ..... G02B 27/12–27/123; G02B 6/3516; G02B 6/29311; G02B 6/293411; G02B 6/29329;
(Continued)

(56) References Cited

U.S. PATENT DOCUMENTS 3,514,534 A * 5/1970 Adrianus .................. G02F 1/33
                                                          348/198
3,743,383 A   7/1973 Giallorenzi
(Continued)

FOREIGN PATENT DOCUMENTS

DE         10233074 A1    2/2004
WO   WO 2005121889 A2   12/2005

OTHER PUBLICATIONS

Zhan Sheng-bao, Zhao Shang-hong, Chu Xing-chun, Wu Zhuo-liang, Shi Lei, Spectral beam combining of fiber lasers based on a transmitting volume Bragg grating,Optics & Laser Technology, vol. 42, Issue 2,2010, pp. 308-312, ISSN 0030-3992, https://doi.org/10.1016/j.optlastec.2009.07.010 (Year: 2009).*

*Primary Examiner* — Zachary W Wilkes
(74) *Attorney, Agent, or Firm* — Leydig, Voit & Mayer, Ltd.

(57) ABSTRACT

An optical assembly includes a volume grating configured to influence a beam direction of at least one light beam, and a switching device arranged in a beam path upstream of the volume grating. The switching device is configured to switch the beam direction and/or beam position of the at least one light beam from a first beam direction and/or beam position, in which the at least one light beam does not impinge on the volume grating at an acceptance angle of the volume grating, to a second beam direction and/or beam position, in which the at least one light beam impinges on the volume grating at the acceptance angle, and/or vice versa.

15 Claims, 6 Drawing Sheets

(51) Int. Cl.
*G02B 27/12* (2006.01)
*G02B 27/14* (2006.01)
*G02B 5/18* (2006.01)

(58) Field of Classification Search
CPC ........ G02B 26/0808; G02F 1/33–1/335; G02F 1/11–1/116
See application file for complete search history.

(56) References Cited

U.S. PATENT DOCUMENTS

| | | | | |
|---|---|---|---|---|
| 4,568,911 A * | 2/1986 | Yamashita | ................ | G02F 7/00 341/137 |
| 4,929,043 A * | 5/1990 | Hatori | ................ | G02B 6/12004 385/8 |
| 5,105,304 A * | 4/1992 | Tanaka | ..................... | G02F 1/11 348/769 |
| 5,883,734 A * | 3/1999 | Suzuki | ..................... | G02F 1/33 359/320 |
| 6,154,307 A | 11/2000 | Veronesi et al. | | |
| 6,804,000 B2 * | 10/2004 | Roorda | ................ | G01N 21/645 250/458.1 |
| 6,885,807 B2 * | 4/2005 | Riza | ........................ | G02F 1/11 385/10 |
| 7,019,891 B2 * | 3/2006 | Johnson | ............. | B23K 26/0626 219/121.6 |
| 7,324,286 B1 | 1/2008 | Glebov et al. | | |
| 7,428,104 B2 | 9/2008 | Engelhardt | | |
| 7,965,437 B2 * | 6/2011 | Lovering | ................. | G02F 1/11 359/285 |

\* cited by examiner

OPTICAL ASSEMBLY AND METHOD FOR INFLUENCING THE BEAM DIRECTION OF AT LEAST ONE LIGHT BEAM

CROSS-REFERENCE TO PRIOR APPLICATIONS

This application is a U.S. National Stage Application under 35 U.S.C. § 371 of International Application No. PCT/EP2017/084303 filed on Dec. 22, 2017, and claims benefit to German Patent Application No. DE 10 2016 125 630.7 filed on Dec. 23, 2016. The International Application was published in German on Jun. 28, 2018, as WO 2018/115397 A1 under PCT Article 21(2).

FIELD

The invention relates to an optical assembly with a volume grating for influencing the beam direction and/or beam position of at least one light beam.

The invention also relates to a method for influencing the beam direction and/or beam position of at least one light beam.

BACKGROUND

Optical assemblies and methods for influencing the beam direction of at least one light beam, in which a volume grating, for example an acousto-optical deflector (AOD) is used for influencing the beam direction of at least one light beam by diffraction, are known from practice. For example, light beams from lasers can be fed into such an AOD in such a way that the AOD diffracts optimally. Light beams of different lasers are frequently influenced in this process. Problems may arise in such a scenario if several lasers are active simultaneously. Frequencies applied to the AOD act in different ways on the individual light beams with possibly different wavelengths. In this case, usually only the diffracted light can be used, a limited diffraction efficiency being very disadvantageous for some applications. In many applications, it is furthermore desirable to generate different diffraction orders of light beams and to be able to choose between these different diffraction orders, or between the zeroth and the first diffraction order, for a particular application.

SUMMARY

In an embodiment, the present invention provides an optical assembly which includes a volume grating configured to influence a beam direction of at least one light beam, and a switching device arranged in a beam path upstream of the volume gratin. The switching device is configured to switch the beam direction and/or beam position of the at least one light beam from a first beam direction and/or beam position, in which the at least one light beam does not impinge on the volume grating at an acceptance angle of the volume grating, to a second beam direction and/or beam position, in which the at least one light beam impinges on the volume grating at the acceptance angle, and/or vice versa.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an optical assembly and a method of the type mentioned at the beginning such that a flexible change between different diffraction orders of a light beam being guided through the volume grating is made possible with structurally simple means.

According to an embodiment, the optical assembly is designed and developed such that a switching device for switching the beam direction and/or beam position of at least one light beam from a first beam direction and/or beam position, in which the at least one light beam does not impinge on the volume grating at an acceptance angle of the volume grating, to a second beam direction and/or beam position, in which the at least one light beam impinges on the volume grating at the acceptance angle, and/or vice versa is arranged in a beam path upstream of the volume grating.

Furthermore, the method according to an embodiment is designed and developed such that a switching of the beam direction and/or beam position of at least one light beam from a first beam direction and/or beam position, in which the at least one light beam does not impinge on the volume grating at an acceptance angle of the volume grating, to a second beam direction and/or beam position, in which the at least one light beam impinges on the volume grating at the acceptance angle, and/or vice versa, takes place by means of a switching device arranged in a beam path upstream of the volume grating.

In the manner according to an embodiment of the invention, it was first realized that by skillful beam guidance of the at least one light beam upstream of the volume grating, the above object is achieved in a surprisingly simple manner. In a further manner according to an embodiment of the invention, it was discovered that this beam guidance can be realized in a particularly effective manner by a switching device which can bring about a switching of the beam direction and/or beam position of the at least one light beam between two beam directions and/or beam positions. The first beam direction and/or beam position is characterized in that the at least one light beam does not impinge on the volume grating at an acceptance angle of the volume grating in this first beam direction and/or beam position, whereas the second beam direction and/or beam position is characterized in that the at least one light beam impinges on the volume grating at the acceptance angle in this second beam direction and/or beam position. When it is mentioned here that the light beam impinges on the volume grating "at the acceptance angle," this means that the light beam is essentially within an angle range which leads to diffraction of the light beam by the volume grating. If the light beam is not at the acceptance angle, this means that the light beam is outside this angle range. If the light beam does not impinge on the volume grating at an acceptance angle, diffraction of the light beam by the volume grating does not take place. The switching device is designed such that a flexible switching from the first to the second beam direction and/or beam position and/or from the second to the first beam direction and/or beam position can take place. A user thus has the choice of whether the volume grating is used as a quasi-passive or as an active element, that is, without diffraction or with diffraction of the light beam. The switching process by means of the switching device generates a discontinuous change between two different operating states, virtually with a jump between these operating states with and without diffraction of the light beam.

Consequently, with the optical assembly according to an embodiment of the invention and the method according to an embodiment of the invention, an optical assembly and a method of the type mentioned at the beginning are specified, with which a flexible change between different diffraction orders of a light beam guided through the volume grating is made possible with structurally simple means, namely merely by integrating or using a suitable switching device for switching the beam direction and/or beam position of at least one light beam.

In a structurally particularly simple manner, the switching device or the switching of the beam direction and/or beam position of the at least one light beam can be activated by an adjustment unit for presetting and adjusting the first beam direction of the at least one light beam. Such an adjustment unit is initially provided for the secure guidance of the at least one light beam in the optical assembly so that the at least one light beam is guided to the volume grating in a suitable manner. By suitable actuation of the adjustment unit, the at least one light beam can be influenced with regard to its first beam direction in such a way, frequently only slightly, that it impinges on the switching device in such a way that switching takes place. In this case, in a particularly advantageous manner, only one component, the adjustment unit, needs to be moved or activated in order to activate the switching device.

In a further advantageous manner, the switching device can be designed to increase the adjustment range of the adjustment unit. In other words, the effect of adjusting the beam direction is increased or superimposed by a movement or actuation of the adjustment unit by means of the switching device.

In a specific exemplary embodiment, the adjustment unit may have a mirror, a lens, or a movable fiber output. A mirror of an adjustment unit could guide a light beam generated by a light source from a first beam direction, in which the light beam impinges on the volume grating, to a mirror of the switching device in a particularly simple manner so that the light beam, with a further reflection at a further mirror where applicable, impinges on the volume grating at the acceptance angle in a second beam direction. In this way, a particularly simple switching between the first beam direction and the second beam direction and/or vice versa is possible, wherein the switching can be activated by moving a mirror of the adjustment unit. However, changing the beam direction of the at least one light beam to activate switching may also be accomplished by a lens or a movable fiber output.

In principle, the adjustment unit can advantageously be motorized so that switching can be effected by a motor. The required positions for the two switching states or operating states or beam directions can be stored as calibration values in a memory of an electronic controller or in a computer.

In a further advantageous exemplary embodiment, the switching device or the switching of the beam direction and/or beam position of the at least one light beam can be activated by a device for changing the polarization of the at least one light beam, preferably a $\lambda/2$ plate, or by changing the wavelength of the at least one light beam. By means of a device for changing the polarization of the at least one light beam, a light beam emanating from a light source can be changed in its polarization such that a corresponding component of the switching device, for example a polarization beam splitter, either leaves the light beam in its first beam direction or, after changed polarization, brings about a diversion of the light beam in such a way that the light beam impinges on the volume grating in the second beam direction.

Alternatively, the switching device can be activated by changing the wavelength of the at least one light beam, wherein, for this purpose, interaction with, for example, a dichroic beam splitter of the switching device can bring about a suitable change in the beam direction of the light beam from the first beam direction to the second beam direction.

Both the device for changing the polarization of the at least one light beam and also a change of the wavelength of the at least one light beam can be motorized, wherein, for example, a $\lambda/2$ plate for changing the polarization of the at least one light beam can be pivoted by a motor in a suitable manner. In these cases of using a device for changing the polarization of the at least one light beam or changing the wavelength of the at least one light beam, suitable calibration values for the two switching states or operating states or beam directions can also be stored in a memory of an electronic circuit or of a computer.

With regard to a particularly efficient switching device with a particularly simple switching between the first and the second beam direction and/or vice versa, the switching device can have at least one and preferably two mirrors, a polarization beam splitter, and/or a dichroic beam splitter. In particular when the switching device is activated by an adjustment unit, by a device for changing the polarization of the at least one light beam, or by changing the wavelength of the at least one light beam, these components result in a particularly effective and at the same time simple optical assembly in each case.

Depending on the application, a device for changing the polarization of a light beam can be arranged in the beam path upstream of the volume grating and preferably between the switching device and the volume grating. This provides a further simple—depending on the application case—required influencing of the light beam before passage through the volume grating. In a particularly simple manner, the device for changing the polarization can have a $\lambda/2$ plate.

In order to realize a particularly simple and compact optical assembly, a beam combiner for at least two light beams can be arranged in the beam path upstream of the volume grating. Such a beam combiner can be formed by a dichroic or by a polarizing beam splitter. Such beam splitters exist in different embodiments so that individual adaptation to different applications is made possible.

In a further specific and particularly simple embodiment of the optical assembly, the volume grating can be an acousto-optical deflector (AOD), acousto-optical modulator (AOM), acousto-optical tunable filter (AOTF), or a non-acousto-optical element. Said acousto-optical components diffract light into one or more first diffraction orders corresponding to impressed acoustic frequencies. Basically, at least two light beams can be guided through the volume grating.

Figure 1:
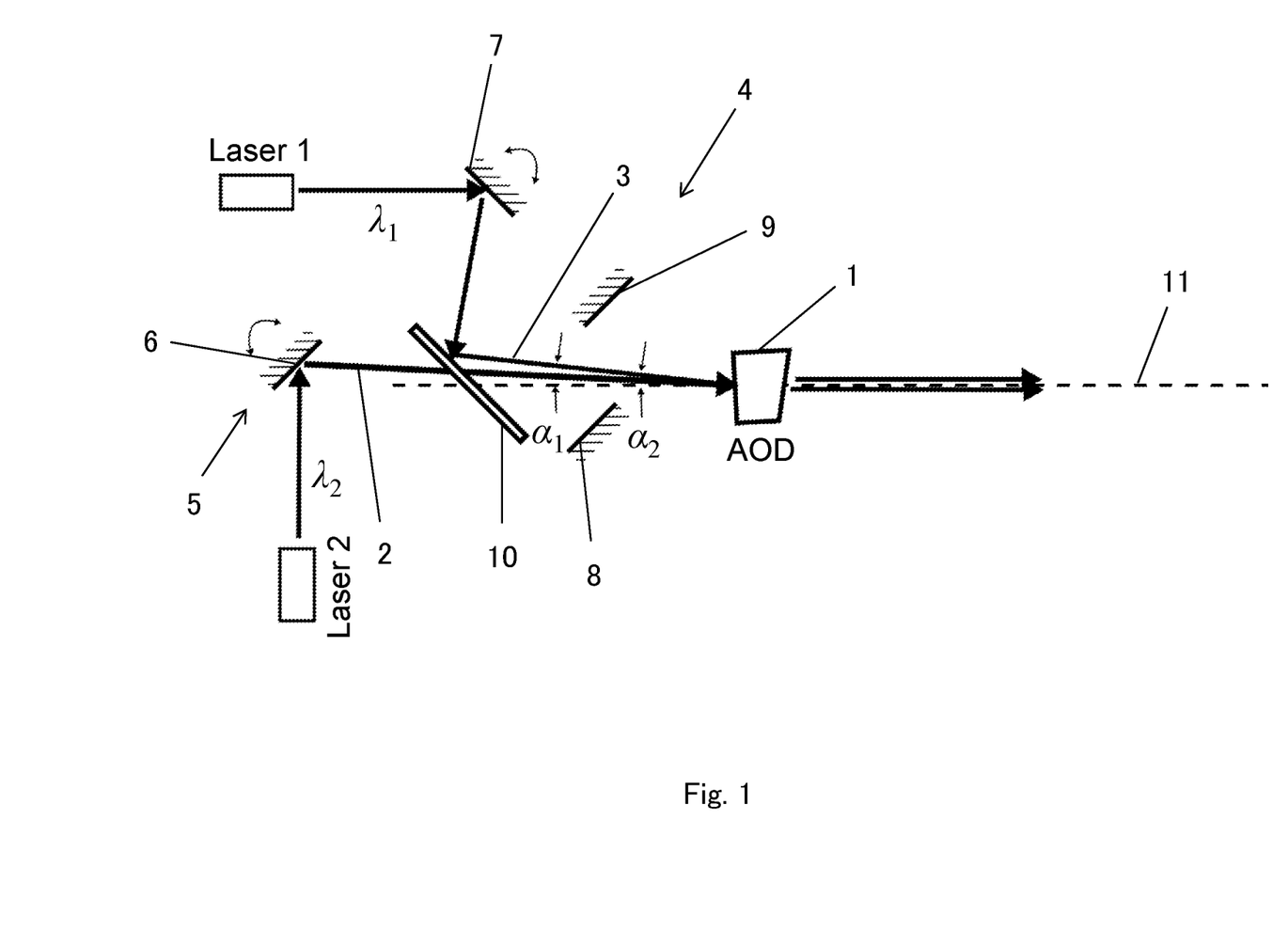
FIG. 1 a schematic illustration of an optical assembly in accordance with a first exemplary embodiment of the invention.
Figure 2:
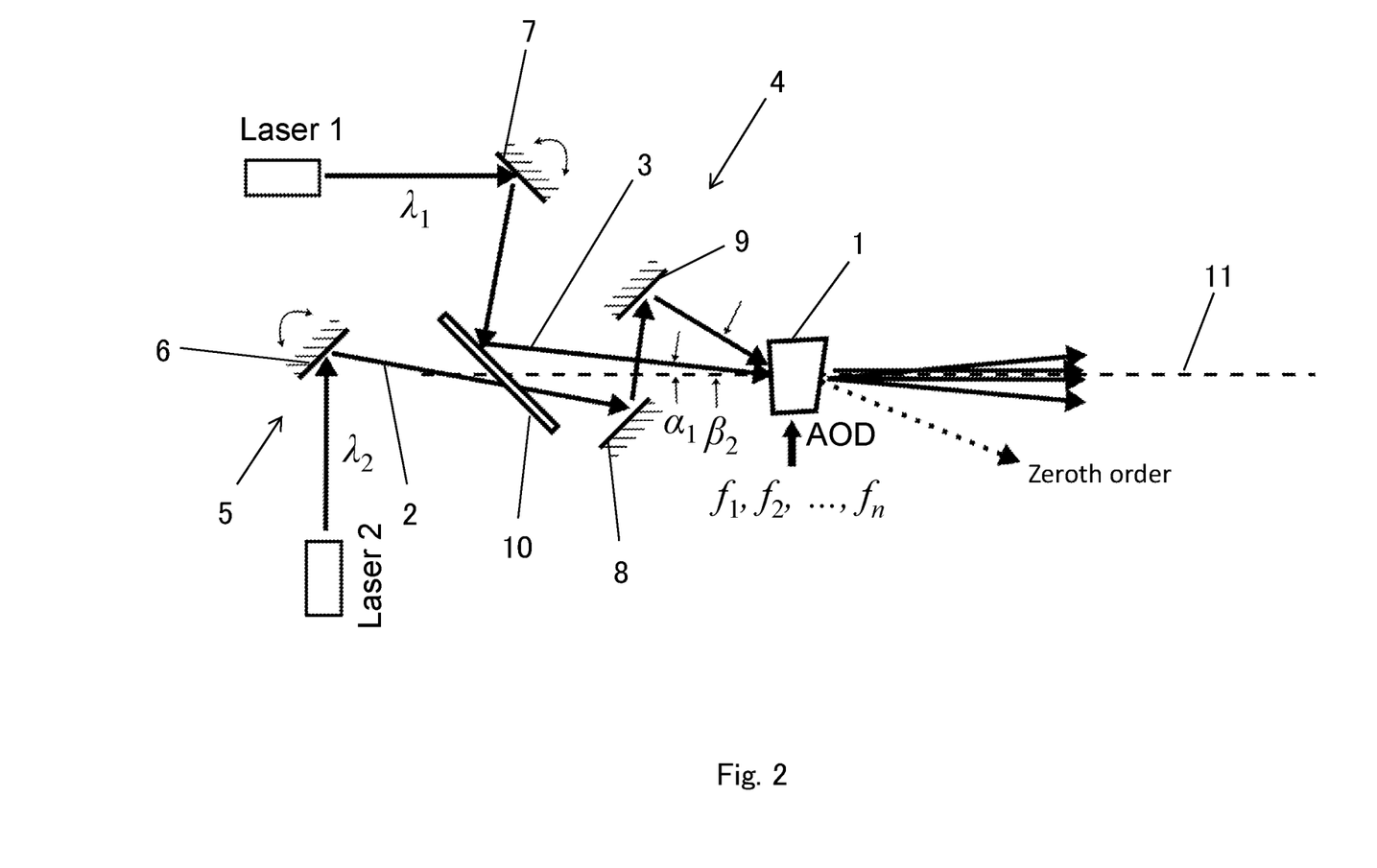
FIG. 2 a schematic illustration of the optical assembly of FIG. 1, wherein a light beam is switched into the second beam direction.

FIGS. 1 and 2 show, in a schematic illustration, a first exemplary embodiment of an optical assembly according to the invention. The optical assembly has a volume grating 1 designed as an AOD for influencing the beam direction of two light beams 2, 3. The light beams 2 and 3 are guided through the volume grating 1. In all exemplary embodiments described herein and also in other exemplary embodiments, at least two light beams 2, 3 can be guided through the volume grating 1. With regard to a flexible change between different diffraction orders of a light beam 2 guided through the volume grating 1, a switching device 4 for switching the beam direction of the light beam 2 from a first beam direction, in which the light beam 2 does not impinge on the volume grating 1 at an acceptance angle of the volume grating 1, to a second beam direction, in which the light beam 2 impinges on the volume grating 1 at the acceptance angle, and vice versa, is arranged in a beam path upstream of the volume grating 1. It is therefore possible to switch back and forth arbitrarily between the two beam directions in order to satisfy different applications.

The switching device 4 or the switching of the beam direction of the light beam 2 can be activated by an adjustment unit 5 which is provided for presetting and adjusting the first beam direction of the light beam 2. The adjustment unit 5 has a mirror 6 with which the beam direction of the light beam 2 can be adjusted. A mirror 7 for adjusting the beam direction of the light beam 3 is correspondingly provided.

The switching device 4 has two mirrors 8, 9 which, after a pivoting of the light beam 2 from its first beam direction according to FIG. 1, direct the light beam 2 onto the mirror 8 by means of the mirror 6 after a further reflection at the mirror 9 into its second beam direction, in which the light beam 2 impinges on the volume grating 1 at the acceptance angle. This second operating state is shown in FIG. 2.

During switching, the light beam 3 remains in its original direction, the light beam 3 being generated by a first laser and directed by means of the mirror 7 onto a beam combiner 10 and then impinging on the volume grating 1 at an angle $\alpha_1$ to an optical axis 11. This angle $\alpha_1$ remains unchanged during the switching by means of the switching device 4.

In the first operating state, in which the light beam 2 does not impinge on the volume grating 1 at the acceptance angle, the light beam 2 generated by a second laser impinges on the volume grating 1 at an angle $\alpha_2$ to the optical axis 11. In the second operating state shown in FIG. 2, the light beam 2 impinges after the switching process on the volume grating 1 at an angle $\beta_2$ to the optical axis 11. This angle $\beta_2$ may be four to five degrees, for example.

According to FIG. 2, the volume grating 1 designed as an AOD brings about a diffraction of the light beam 2 corresponding to the impressed frequencies $f_1, f_2, \ldots, f_n$. In this case, a dotted arrow line shows the zeroth diffraction order and the solid arrow lines show diffractions of the first order corresponding to the respectively different frequencies with which the volume grating 1 is impinged. After passing through the volume grating 1, the undiffracted light beam 3 runs parallel to the optical axis 11.

A device for changing the polarization of a light beam, for example a λ/2 plate, could also be arranged between the mirror 9 and the volume grating 1 in order to change the polarization of the light beam 2 before its entry into the volume grating 1.

In the exemplary embodiment of the invention shown in FIGS. 1 and 2 and in the second and third exemplary embodiments shown in FIGS. 3 to 6, several laser beam paths are brought together by beam combiners 10. The combining can be brought about by dichroic or by polarizing beam splitters.

In the exemplary embodiment shown in FIGS. 1 and 2, two light beams 2 and 3 having wavelengths λ1 and λ2 are brought together by a beam combiner 10 designed as a dichroic beam splitter.

A volume grating 1 designed as an AOD is located in the common beam path. The AOD has an acceptance angle that may be wavelength-dependent. When light impinges on the AOD at the acceptance angle, the AOD diffracts the light into one or more first diffraction orders corresponding to the impressed acoustic frequencies $f_1, f_2, \ldots, f_n$.

A fundamental objective of the optical assembly is that, downstream of the AOD, the common beam path runs along the optical axis 11. To this end, adjustment units 5 arranged in the separate beam paths are used. This adjustment is first carried out in such a way that the beams do not impinge on the AOD at the acceptance angle and pass through it without being diffracted.

In FIG. 1, the mirrors 6 and 7 are adjusted such that the light beams 2 and 3 have the angles $\alpha_1$ and $\alpha_2$ to the optical axis 11 when they impinge on the AOD so that the transmitted light beams 2 and 3 leave the AOD in parallel and on the optical axis 11. The adjustment units may also be movable lenses, movable fiber outputs, or the like.

If the AOD is now to be used to influence the angle of one of the light beams 2, 3, this light beam 2, 3 or this beam of the light beam 2, 3 must impinge on the AOD at the acceptance angle, i.e. usually within an acceptance angle range. For this purpose, one of said adjustment units 5 is used, namely that which is located in the beam path of the desired light beam 2, 3.

According to FIG. 2, the mirror 6 is adjusted in such a way that the associated beam or the associated light beam 2 impinges on the AOD at the acceptance angle. The light beam 2 is at the angle $\beta_2$ to the optical axis 11. The beam can now be diffracted by the AOD if it is impressed with one or more frequencies $f_1, f_2, \ldots, f_n$. The other light beam 3 is still not diffracted by the AOD since it does not impinge on the AOD at the acceptance angle.

A predetermined angle difference lies between the acceptance angle and the angle at which the AOD must be impinged in order for the undiffracted light to exit along the optical axis 11. During switching, this angle difference leads to a beam offset in the beam path of the respective laser being switched. Depending on the angle difference and the geometric distances, this beam offset may be so large that the beam combiner 10 or other elements in the beam paths need to be designed with very large diameters. This can be circumvented according to the invention by providing in the common beam path an assembly of mirrors 8 and 9 which increases or superimposes the effect of the adjustment by the adjustment unit 5.

According to FIG. 2, the two mirrors 8 and 9 are provided for this purpose. If the mirror 6 is moved such that the light from the second laser impinges on the mirror 8, the light will take a different path to that in FIG. 1 and the light beam 2 will impinge on the AOD at the acceptance angle.

In this way, each beam path can be switched individually without the beam paths having to accept a particularly large beam offset in each case. Moreover, only one component per beam path, here the mirror 6, needs to be moved for switching to take place. With a suitable design, the optical assembly can also be used for more than two lasers or light sources.

Figure 3:
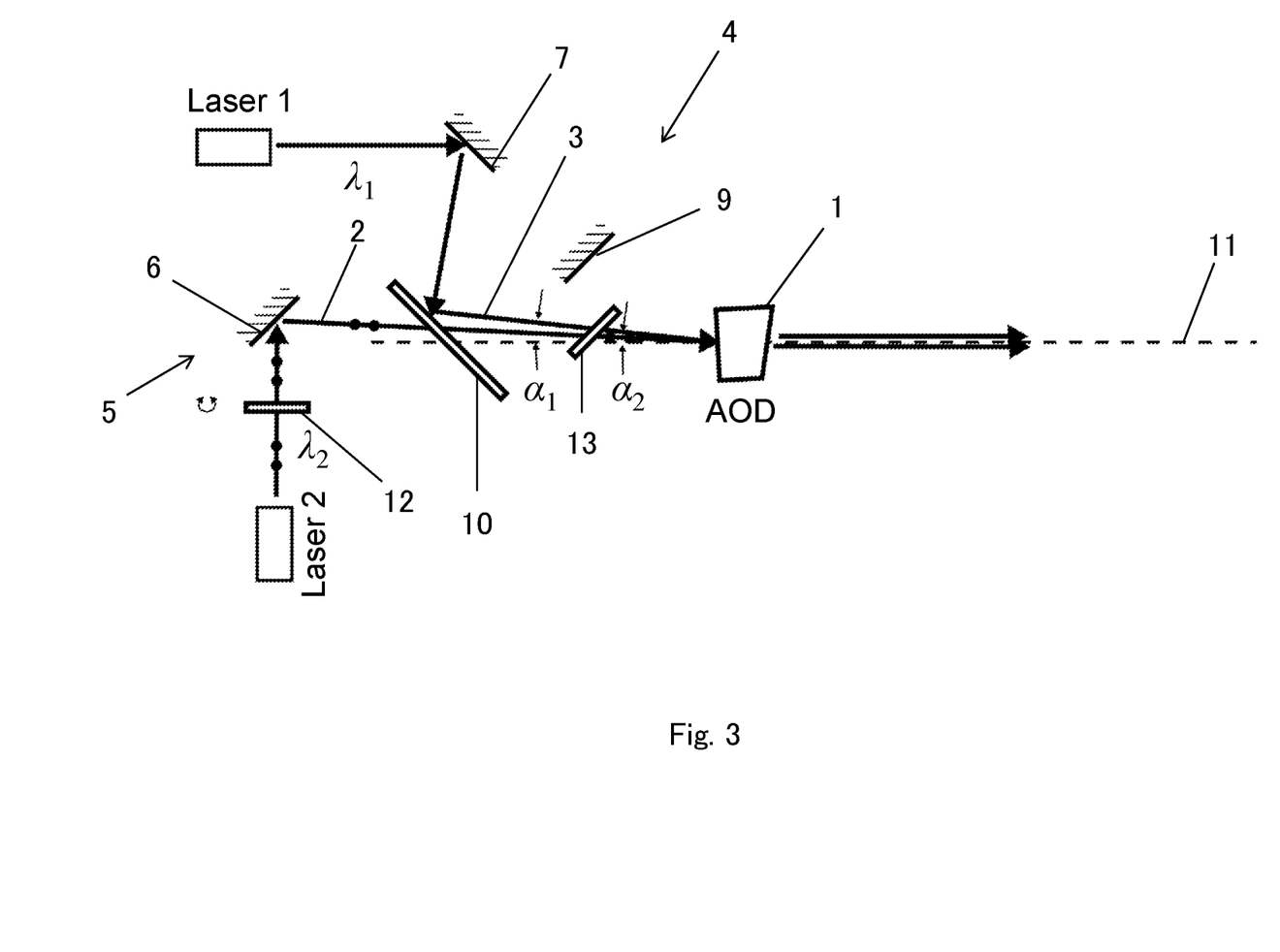
FIG. 3 a schematic illustration of an optical assembly in accordance with a second exemplary embodiment of the invention.
Figure 4:
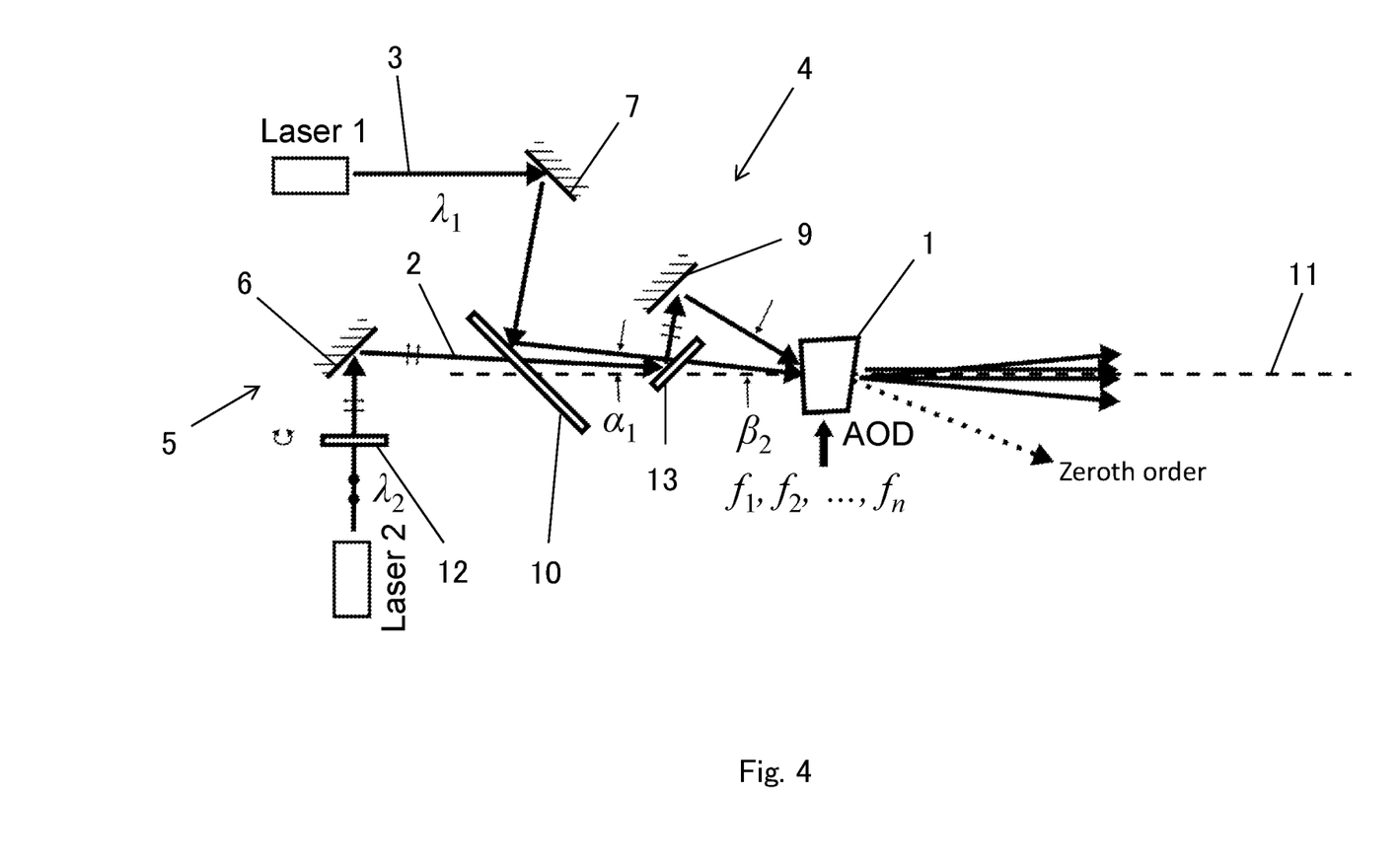
FIG. 4 a schematic illustration of the optical assembly of FIG. 3, wherein a light beam is switched into the second beam direction.
Figure 5:
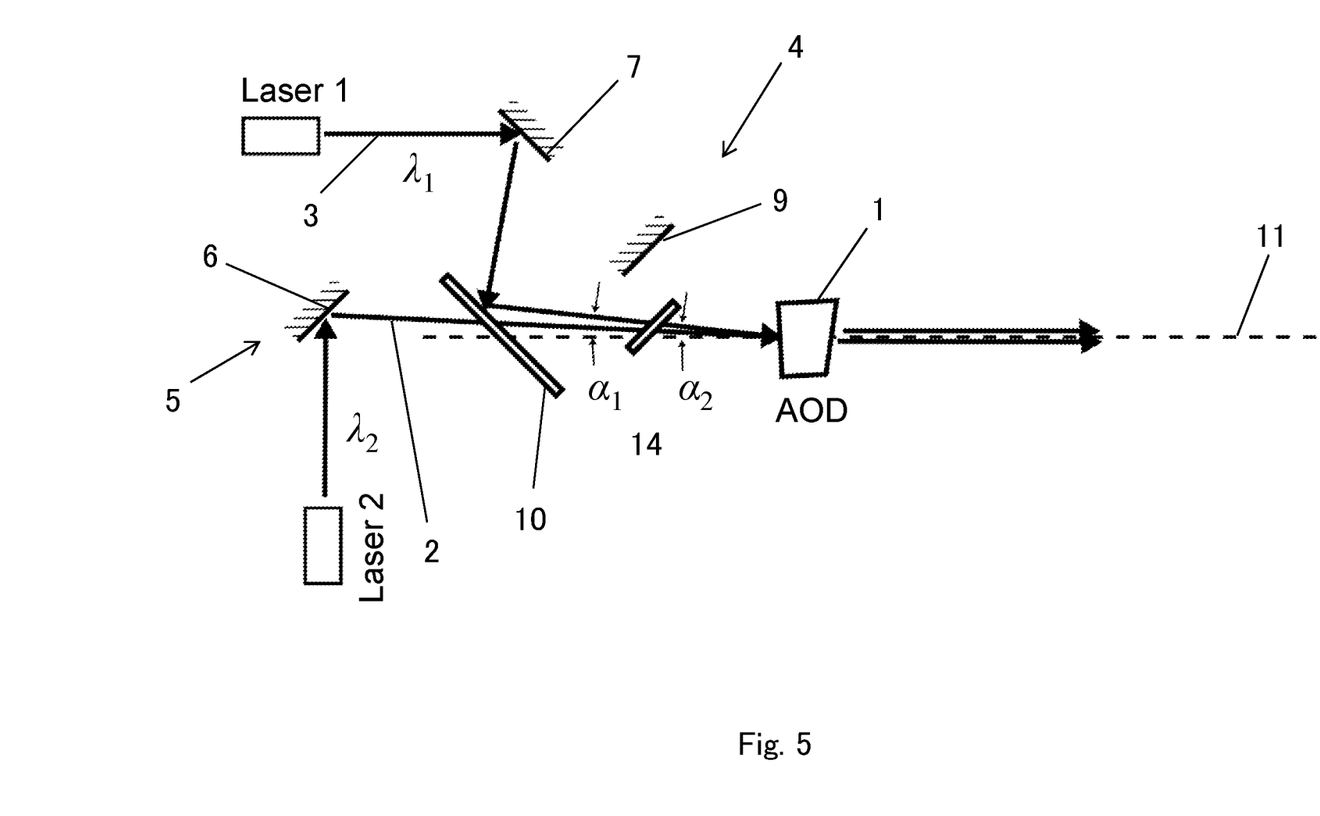
FIG. 5 a schematic illustration of an optical assembly in accordance with a third exemplary embodiment of the present invention.
Figure 6:
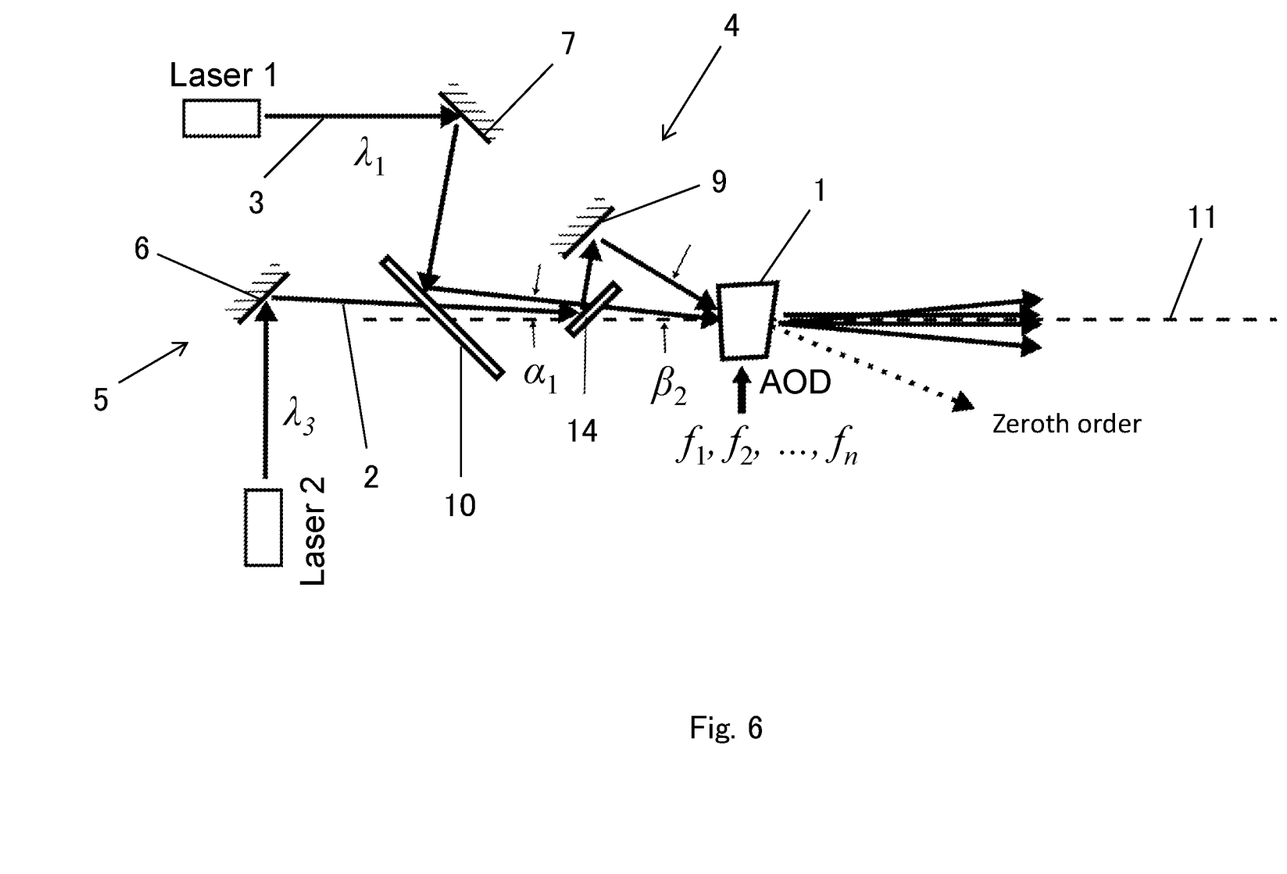
FIG. 6 a schematic illustration of the optical assembly of FIG. 5, wherein a light beam is switched into the second beam direction.

FIGS. 3 and 4 show schematic illustrations of a second exemplary embodiment of an optical assembly according to the invention, and FIGS. 5 and 6 show schematic illustrations of a third exemplary embodiment of an optical assembly according to the present invention.

The basic structure of the second and third exemplary embodiments corresponds to that of the first exemplary embodiment. However, the switching devices 4 are in each case of a different design and the switching devices 4 or the switching of the beam directions are not activated by the adjustment unit 5.

In the second exemplary embodiment according to FIGS. 3 and 4, FIG. 3 shows correspondingly to FIG. 1 the first operating state and FIG. 4 shows correspondingly to FIG. 2 the second operating state of the optical assembly. According to FIGS. 3 and 4, a device for changing the polarization of the light beam 2 in the form of a $\lambda/2$ plate 12 is arranged between the second laser and the mirror 6 of the adjustment unit 5. With this $\lambda/2$ plate 12, the polarization of the light beam 2 for activating the switching operation or the switching device 4 is rotated by 90 degrees. After the reflection at the mirror 6, the light beam 2 passes through the beam combiner 10 without any change and then passes onto a polarization beam splitter 13 which, depending on the polarization direction, either lets the light beam 2 pass according to FIG. 3 or reflects the light beam 2 onto the mirror 9 according to FIG. 4. Depending on the position of the $\lambda/2$ plate 12, the situation according to FIG. 3, or the situation according to FIG. 4, therefore results and thus a switching of the beam direction of the light beam 2 from a first beam direction to a second beam direction, wherein the light beam 2 impinges in the second beam direction at the acceptance angle on the volume grating 1 or the AOD. The exemplary embodiment shown in FIGS. 3 and 4 corresponds to the first exemplary embodiment according to FIGS. 1 and 2 except for the design of the switching device 4 and the additional provision of the $\lambda/2$ plate 12. In this respect, reference is made to the description of FIGS. 1 and 2 to avoid repetitions. In principle, a switching (realized in this example by the $\lambda/2$ plate) can be arranged in each of the existing beams.

In the third exemplary embodiment according to FIGS. 5 and 6, the switching device 4 is designed such that a dichroic beam splitter 14 or color filter is arranged on the optical axis 11 of the optical assembly instead of the mirror 8 according to the first exemplary embodiment. Switching between the two operating states according to FIGS. 5 and 6 takes place by a suitable change in the wavelength of the light beam 2 from a wavelength $\lambda 2$ to a wavelength $\lambda 3$. The wavelengths $\lambda 2$ and $\lambda 3$ must be adapted to the beam splitter 14 or vice versa such that at the wavelength $\lambda_2$, the light beam 2 passes through the beam splitter 14 and at the wavelength $\lambda_3$, the light beam 2 is reflected by the beam splitter 14 onto the mirror 9 so that the light beam 2 ultimately impinges at the acceptance angle, here the angle $\beta_2$ to the optical axis 11, on the volume grating 1. In this exemplary embodiment, it is also conceivable that all the beams present can be switched between the passive state and the active state.

Otherwise, the third exemplary embodiment according to FIGS. 5 and 6 also corresponds to the first exemplary embodiment according to FIGS. 1 and 2 so that reference can be made with regard to the further components of the optical assembly to the description of FIGS. 1 and 2 in order to avoid repetitions.

In respect of further advantageous embodiments of the optical assembly according to the invention and the method according to the invention, reference is made to the general part of the description and to the appended claims in order to avoid repetitions.

Finally, it is expressly pointed out that the above-described exemplary embodiments only serve for the discussion of the claimed teaching but do not restrict it to the exemplary embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Volume grating
2 Light beam
3 Light beam
4 Switching device
5 Adjustment unit
6 Mirror
7 Mirror
8 Mirror
9 Mirror
10 Beam combiner
11 Optical axis
$\lambda/2$ plate
13 Polarization beam splitter
14 Dichroic beam splitter

The invention claimed is:
1. An optical assembly comprising:
a volume grating configured to influence a beam direction of at least one light beam; and a switching device arranged in a beam path upstream of the volume grating and configured to switch the beam direction and/or beam position of the at least one light beam from a first beam direction and/or beam position, in which the at least one light beam impinges on the volume grating not at an acceptance angle of the volume grating, to a second beam direction and/or beam position, in which the at least one light beam impinges on the volume grating at the acceptance angle, and/or vice versa.

2. The optical assembly according to claim 1, wherein the switching device comprises an adjustment unit configured to preset and adjust the first beam direction of the at least one light beam, and wherein the switching device or the switching of the beam direction and/or beam position of the at least one light beam is activatable by the adjustment unit.

3. The optical assembly according to claim 2, wherein the switching device is designed to increase the adjustment range of the adjustment unit.

4. The optical assembly according to claim 2, wherein the adjustment unit has a mirror, a lens, or a movable fiber output.

5. The optical assembly according to claim 1, wherein the switching device or the switching of the beam direction and/or beam position of the at least one light beam is activatable by a device configured to change the polarization of the at least one light beam, or by changing the wavelength of the at least one light beam.

6. The optical assembly according to claim 5, wherein the device configured to change the polarization is a $\lambda/2$ plate.

7. The optical assembly according to claim 1, wherein the switching device has at least one mirror, a polarization beam splitter, and/or a dichroic beam splitter.

8. The optical assembly according to claim 7, wherein the switching device has at least two mirrors.

9. The optical assembly according to claim 1, further comprising a device configured to change the polarization of a light beam arranged in the beam path upstream of the volume grating.

10. The optical assembly according to claim 9, wherein the device configured to change the polarization is a $\lambda/2$ plate arranged in the beam path between the switching device and the volume grating.

11. The optical assembly according to claim 1, further comprising a beam combiner for at least two light beams arranged in the beam path upstream of the volume grating.

12. The optical assembly according to claim 11, wherein the beam combiner is a dichroic or polarizing beam splitter.

13. The optical assembly according to claim 1, wherein the volume grating is an acousto-optical deflector (AOD), acousto-optical modulator (AOM), acousto-optical tunable filter (AOTF), or a non-acousto-optical element.

14. A method for influencing a beam direction of at least one light beam using an optical assembly, the optical assembly comprising a volume grating configured to influence the beam direction of the at least one light beam, and a switching device arranged in a beam path upstream of the volume grating, the method comprising:

switching, by the switching device, of the beam direction and/or beam position of the at least one light beam from a first beam direction and/or beam position, in which the at least one light beam impinges on the volume grating not at an acceptance angle of the volume grating, to a second beam direction and/or beam position, in which the at least one light beam impinges on the volume grating at the acceptance angle, and/or vice versa.

15. A method for influencing a beam direction of at least one light beam, the method comprising:

switching, by a switching device arranged in a beam path of at least one light beam upstream of a volume grating, of the beam direction and/or beam position of the at least one light beam from a first beam direction and/or beam position, in which the at least one light beam impinges on the volume grating not at an acceptance angle of the volume grating, to a second beam direction and/or beam position, in which the at least one light beam impinges on the volume grating at the acceptance angle, and/or vice versa.

* * * * *